United States Patent Office 3,231,614
Patented Jan. 25, 1966

3,231,614
N-2-PROPYNYL AND N,N-DI(2-PROPYNYL)-
(2-PROPYNYLOXY)-ANILINES
Chester E. Pawloski, Bay City, Mich., assignor to The
Dow Chemical Company, Midland, Mich., a corporation of Delaware
No Drawing. Filed Dec. 26, 1963, Ser. No. 333,678
5 Claims. (Cl. 260—574)

The compounds of the present invention correspond to the formula

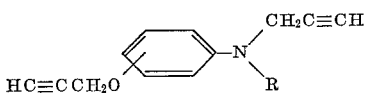

wherein R represents hydrogen or 2-propynyl. These compounds are organic liquids which are somewhat soluble in many organic solvents and of low solubility in water. The novel compounds of the present invention have been found to be useful as pesticides for the control of various insect, worm, bacterial, fungal and plant organisms such as round worms, aphids, blight, seed fungus, pigweeds, crabgrass, moneywort or coontail.

The new compounds can be prepared by reacting a propargyl halide with an o-, m- or p-aminophenol. The reaction is carried out in the presence of a basic material and preferably in an organic liquid such as isopropanol, acetone or methyl ethyl ketone. The reaction takes place smoothly at a temperature at which the halide of reaction is produced and preferably at temperatures from about 0° to 100° C. The halide of the reaction appears in the reaction mixture as a salt of the metal cation from the employed basic material. Representative basic materials include potassium carbonate and sodium carbonate.

Good results are obtained when employing one molecular proportion of aminophenol and at least two molecular proportions, preferably an excess, of each of the propargyl halide and the basic material. The reaction consumes the reactants in the proportion of one mole of aminophenol and two or three moles each of propargyl halide and basic material depending upon whether the N,N-di-2-propynyl (2-propynyloxy)aniline or the N-2-propynyl (2-propynyloxy)aniline is desired. When optimum yields are desired the use of amounts which represent such proportions is preferred. Upon completion of the reaction the desired product can be separated and purified by conventional procedures.

In carrying out the reaction, the propargyl halide such as the chloride or bromide, aminophenol and basic material can be combined in any convenient manner. However, it is preferable to disperse the reactants in an organic solvent reaction medium. The reaction mixture is maintained at the reaction temperature for a period of time to insure completion of the reaction. The substantial cessation in the formation of the halide of reaction indicates that the reaction is approximately complete. The reaction mixture is then diluted with water and the organic layer which separates in the diluted mixture is collected by such conventional means as decantation. The collected organic layer is then fractionally distilled under reduced pressure to obtain the desired liquid product. This liquid product can then be employed as the toxic constituent in pesticidal compositions.

The following examples are merely illustrations and are not to be construed as limiting.

Example 1.—N-(2-propynyl)-m-(2-propynyloxy)aniline
and N,N-di-(2-propynyl)-m-(2-propynyloxy)aniline

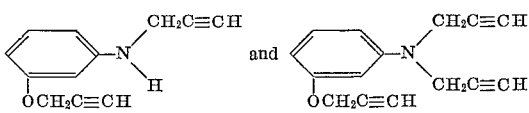

Meta-aminophenol (109 grams), propargyl bromide (357 grams), and potassium carbonate (414 grams) were dispersed in 500 milliliters of acetone. The resulting mixture was heated with stirring at the boiling temperature and under reflux for eight hours. Following the heating period, the reaction mixture was allowed to cool to room temperature and then diluted with water. The organic layer, which separated during the dilution procedure, was collected by decantation and fractionally distilled under reduced pressure. The N,N-di-(2-propynyl)-m-(2-propynyloxy)aniline product was collected at a temperature of 148 to 151° C. and a pressure of 1.1 millimeters. The N-(2-propynyl)-m-(2-propynyloxy)aniline product (refractive index $n/D$ of 1.5888 at 25° C.) was obtained at a temperature of 141 to 145° C. and a pressure of 0.8 millimeters.

Example 2.—N,N-di-(2-propynyl) - p - (2-propynyloxy)-
aniline and N-2-propynyl-p-(2-propynyloxy)aniline Para-aminophenol (109 grams), propargyl bromide (357 grams) and potassium carbonate (552 grams) were dispersed in 500 milliliters of acetone and the resulting mixture processed in exactly the same manner as illustrated in Example 1. When the organic layer obtained in the washing procedure was fractionally distilled under reduced pressure the N,N-di-(2-propynyl)-p-(2-propynyloxy)aniline product was obtained at a temperature of 146° C. and a pressure of 0.7 millimeter. This dark liquid product which decomposes at 170° C. had a refractive index $n/D$ of 1.5808 at 25° C.

In exactly the same manner, p-aminophenol (109 grams), propargyl bromide (236 grams) and potassium carbonate (276 grams) are combined and reacted to obtain N-(2-propynyl)-p-(2-propynyloxy)aniline having a molecular weight of 185.2.

Example 3.—N,N-di-(2-propynyl)-o-(2-
propynyloxy)aniline o-Aminophenol, propargyl bromide and potassium carbonate were reacted in the manner and quantities as shown in Example 1 to obtain the dark liquid N,N-di-(2-propynyl)-o-(2-propynyloxy)aniline product having a refractive index $n/D$ of 1.5681 at 25° C. and decomposing at 160° C. The product distilled over at a temperature of 140° C. and a pressure of 1.3 millimeters.

o-Aminophenol (109 grams), propargyl bromide (236 grams) and potassium carbonate (276 grams) are combined and processed exactly as described in Example 1 to obtain the N-(2-propynyl)-o-(2-propynyloxy)aniline product (molecular weight of 185.2).

The new compounds of the present invention are useful as herbicides and parasiticides for the control of a number of plant and parasite species. For such uses the products can be dispersed on finely divided solids and employed as dusts. Also, such mixtures can be dispersed in water with or without the aid of a surface active dispersing agent and the resulting aqueous suspension employed as sprays, drenches or washes. In other procedures, the products are employed as the toxic constituents in solvent solutions, oil-in-water or water-in-oil emulsions or aqueous dispersions. In representative operations, aqueous compositions containing 10 parts per million by weight of one of N-(2-propynyl)-m-(2-propynyloxy)-aniline and N,N-di-2-propynyloxy aniline give substantially complete kills of pigweeds, crabgrass, Sudan grass and Japanese millet.

I claim:
1. A compound corresponding to the formula

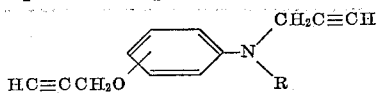

wherein R represents a member of the group selected from hydrogen and 2-propynyl.
2. N-(2-propynyl)-m-(2-propynyloxy)aniline.
3. N,N-di-(2-propynyl)-p-(2-propynyloxy)aniline.
4. N,N-di-(2-propynyl)-o-(2-propynyloxy)aniline.
5. N,N-di-(2-propynyl)-m-(2-propynyloxy)aniline.

No references cited.

CHARLES B. PARKER, *Primary Examiner.*